United States Patent
Svenbrant et al.

(10) Patent No.: US 7,669,887 B2
(45) Date of Patent: Mar. 2, 2010

(54) AIR BAG

(75) Inventors: Emma Svenbrant, Gothenburg (SE); Magnus Karlsson, Gothenburg (SE); Severine Wollin, Shanghai (CN)

(73) Assignee: Autoliv Development AB, Vargarda (SE)

( * ) Notice: Subject to any disclaimer, the term of this patent is extended or adjusted under 35 U.S.C. 154(b) by 491 days.

(21) Appl. No.: 10/561,638

(22) PCT Filed: Jun. 9, 2004

(86) PCT No.: PCT/EP2004/006275

§ 371 (c)(1), (2), (4) Date: Mar. 7, 2007

(87) PCT Pub. No.: WO2005/002930

PCT Pub. Date: Jan. 13, 2005

(65) Prior Publication Data

US 2007/0267851 A1    Nov. 22, 2007

(30) Foreign Application Priority Data

Jun. 20, 2003    (GB) ................................. 0314505.9

(51) Int. Cl.
*B60R 21/16* (2006.01)
*B60R 21/21* (2006.01)
(52) U.S. Cl. .................. 280/730.2; 280/729; 280/743.1
(58) Field of Classification Search ................. 280/729, 280/730.1, 730.2, 742, 743.1
See application file for complete search history.

(56) References Cited

U.S. PATENT DOCUMENTS

| | | | | |
|---|---|---|---|---|
| 5,022,675 A | * | 6/1991 | Zelenak et al. ............ | 280/743.1 |
| 5,454,595 A | * | 10/1995 | Olson et al. ............... | 280/743.1 |
| 5,482,318 A | * | 1/1996 | Sollars, Jr. ................ | 280/743.1 |
| 5,556,128 A | * | 9/1996 | Sinnhuber et al. ......... | 280/730.2 |
| 5,586,782 A | | 12/1996 | Zimmerman, II et al. | |
| 5,603,526 A | * | 2/1997 | Buchanan .................... | 280/739 |
| 5,718,450 A | * | 2/1998 | Hurford et al. ............ | 280/730.2 |
| 5,722,685 A | * | 3/1998 | Eyrainer ................... | 280/730.2 |
| 5,803,485 A | * | 9/1998 | Acker et al. .............. | 280/728.2 |
| 5,895,070 A | * | 4/1999 | Lachat ..................... | 280/730.2 |

(Continued)

FOREIGN PATENT DOCUMENTS

| | | | |
|---|---|---|---|
| DE | 4226954 A1 | * | 2/1994 |
| DE | 195 29 829 C1 | | 10/1996 |
| DE | 102 00 864 A1 | | 8/2002 |
| EP | 0 940 302 A1 | | 9/1999 |
| EP | 1 044 854 A2 | | 10/2000 |

(Continued)

*Primary Examiner*—Ruth Ilan
*Assistant Examiner*—James English
(74) *Attorney, Agent, or Firm*—Brinks Hofer Gilson & Lione

(57) ABSTRACT

A side air bag is disclosed for a motor vehicle, and takes the form of a three-dimensional airbag which is formed from two super-imposed layers of fabric. The super-imposed layers of fabric, when laid flat, have a substantial common area of super-imposition. Infill pieces formed from either at least one gusset forming insert or from a portion or portions of fabric of one or both of the fabric layers which extend beyond the area of super-imposition are provided. The air-bag has an inflatable region towards the upper part of the air-bag and an inflatable region towards the lower part of the air-bag. The two inflatable regions are separated by a part of the air-bag which is constrained when the air-bag is inflated, to have a thickness less than the thickness of either of the said regions.

9 Claims, 6 Drawing Sheets

U.S. PATENT DOCUMENTS

| | | | |
|---|---|---|---|
| 5,899,490 A | 5/1999 | Wipasuramonton et al. | |
| 5,906,391 A | 5/1999 | Weir et al. | |
| 5,945,184 A * | 8/1999 | Nagata et al. | 428/35.2 |
| 6,270,113 B1 * | 8/2001 | Wipasuramonton et al. | 280/730.2 |
| 6,279,944 B1 * | 8/2001 | Wipasuramonton et al. | 280/730.2 |
| 6,349,964 B1 * | 2/2002 | Acker et al. | 280/730.2 |
| 6,352,283 B1 * | 3/2002 | Ellerbrok et al. | 280/743.1 |
| 6,422,593 B1 * | 7/2002 | Ryan | 280/730.2 |
| 6,997,473 B2 * | 2/2006 | Tanase et al. | 280/730.2 |
| 7,000,947 B2 * | 2/2006 | Kumagai et al. | 280/743.1 |
| 7,093,851 B2 * | 8/2006 | Lotspih | 280/730.2 |
| 7,354,063 B2 * | 4/2008 | Keshavaraj | 280/743.1 |
| 7,434,832 B2 * | 10/2008 | Umehara | 280/730.2 |
| 2003/0201631 A1 * | 10/2003 | Ritter | 280/743.1 |
| 2005/0206147 A1 * | 9/2005 | Sievers | 280/743.1 |
| 2008/0252054 A1 * | 10/2008 | Kim et al. | 280/743.2 |

FOREIGN PATENT DOCUMENTS

| | | |
|---|---|---|
| EP | 1 122 134 A1 | 8/2001 |
| EP | 1 393 998 A1 | 3/2004 |
| EP | 1 433 667 A2 | 6/2004 |
| GB | 2390574 A * | 1/2004 |
| JP | 9-118186 | 5/1997 |
| JP | 2000-85515 | 3/2000 |
| WO | WP 02/100691 A1 | 12/2002 |
| WO | WO 2004/106122 A1 | 12/2004 |

* cited by examiner

AIR BAG

CROSS REFERENCE TO RELATED APPLICATIONS

This application claims priority to Great Britain patent application 0314505.9, filed Jun. 20, 2003 and PCT/EP2004/006275, filed Jun. 9, 2004.

FIELD OF THE INVENTION

The present invention relates to an air-bag for use in a motor vehicle, such as a motor car, and more particularly the present invention relates to a side air-bag.

BACKGROUND OF THE INVENTION

A side air-bag is an air-bag which initially is stored within part of a vehicle seat, typically the back-rest of the vehicle seat, or in a side part of the vehicle adjacent the seat.

A side air-bag is of particular value in a side impact situation and, as is known, air-bags which are to provide protection for an occupant of a vehicle during a side impact must be inflated extremely swiftly. Consequently it is desirable for such air-bags to require a minimum amount of gas to inflate.

Various types of side air-bag have been proposed previously.

Many prior proposed side air-bags are so-called "two-dimensional" air-bags. A two-dimensional air-bag is formed from two superimposed layers of fabric of identical size and shape that are secured together at their common periphery to form an air-bag which, in the uninflated state, can be laid out flat. The two superimposed layers may be stitched together with a peripheral seam or, alternatively, a one-piece weaving process may be utilized to produce an air-bag of corresponding form, again having two superimposed layers of identical size and shape that are secured together at their periphery.

In spite of the fact that a side air-bag should be inflated with a minimum amount of gas in order to facilitate rapid inflation, it is also desirable that a side air-bag should have substantial "depth" so that, upon inflation, the air-bag will engage with a seat occupant as soon as possible and provide a maximum lateral "cushion" to protect an occupant in a side impact situation.

A two-dimensional air-bag can be inflated until the opposed sides of the air-bag bulge outwardly away from each other, providing depth or thickness for the air-bag. As the air-bag is inflated in this way, a substantial amount of gas has to be injected into the air-bag, creating an almost cylindrical form, and resulting in the pressure of gas in the air-bag quite high. When inflated in this way, the air-bag may not provide the desired cushioning effect but, instead may cause a seat occupant to "bounce" off the air-bag.

It has been proposed to provide a side air-bag which is a two-dimensional air-bag of the type discussed above. The air-bag has a transverse seam in a central region dividing the air-bag into an upper inflatable region or chamber and a lower inflatable region or chamber. The two inflatable regions or chambers each have a thickness or depth, but near the seam, each has a much lower thickness or depth. The presence of the central seam helps minimize the amount of gas needed to fully inflate the air-bag. Also, the presence of the seam may make it possible, as appropriate, to inflate the two chambers to different internal pressures. However, the presence of the seam in the two-dimensional air-bag means that the overall thickness of the inflatable region or chamber of the air-bag, when it is inflated, is rather small.

It is an object of the present invention to provide an improved side air-bag for a motor vehicle.

SUMMARY OF THE INVENTION

In satisfying the above need, as well as overcoming the enumerated drawbacks and other limitations of the related art, the present invention provides a side air-bag for a motor vehicle. The side air-bag being a three-dimensional air-bag formed from two superimposed layers of fabric which, when laid flat, have at least a substantial common area of superimposition. Infill pieces are formed from at least one gusset forming insert or from a portion of the fabric of one or both of the fabric layers which extend beyond the common area of superimposition. The air-bag has an inflatable region towards the upper part of the air-bag and an inflatable region towards the lower part of the air-bag, each inflatable region being separated by a part of the air-bag which is constrained, when the air-bag is inflated, to have a thickness less than the thickness of either of the said regions.

Preferably, the air-bag includes an upper chamber forming said upper region and a lower chamber forming said lower region, the upper chamber and the lower chamber being separated by a transversely extending seam.

Advantageously, the air-bag is formed from two layers of fabric of substantially identical configuration interconnected by means of a peripheral seam, there being at least one insert in said peripheral seam between the layers of fabric to form a gusset.

Conveniently, there are two inserts, one insert forming a gusset associated with one chamber and the other insert forming a gusset associated with a second chamber.

Preferably, an insert is provided with at least one vent aperture.

Advantageously, each vent aperture is initially sealed by means of a tear-seam.

Conveniently, the superimposed layers of fabric have a substantial common area of superimposition, each layer of fabric having one or more portions thereof which project beyond the area of superimposition, the peripheries of the areas being interconnected by means of a seam.

Preferably, a gas generator is present within the air-bag, the combination of the seam and the gas generator substantially sealing the two chambers from each other, the gas generator being configured to inflate the two chambers to different pressures.

Advantageously, the superimposed layers of fabric each have two portions which project beyond the area of common overlap, the resultant air-bag having, when inflated, an upper chamber and a lower chamber, there being a narrow inflated neck between the upper chamber and the lower chamber.

Conveniently, the two layers of fabric form part of a single fabric element.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
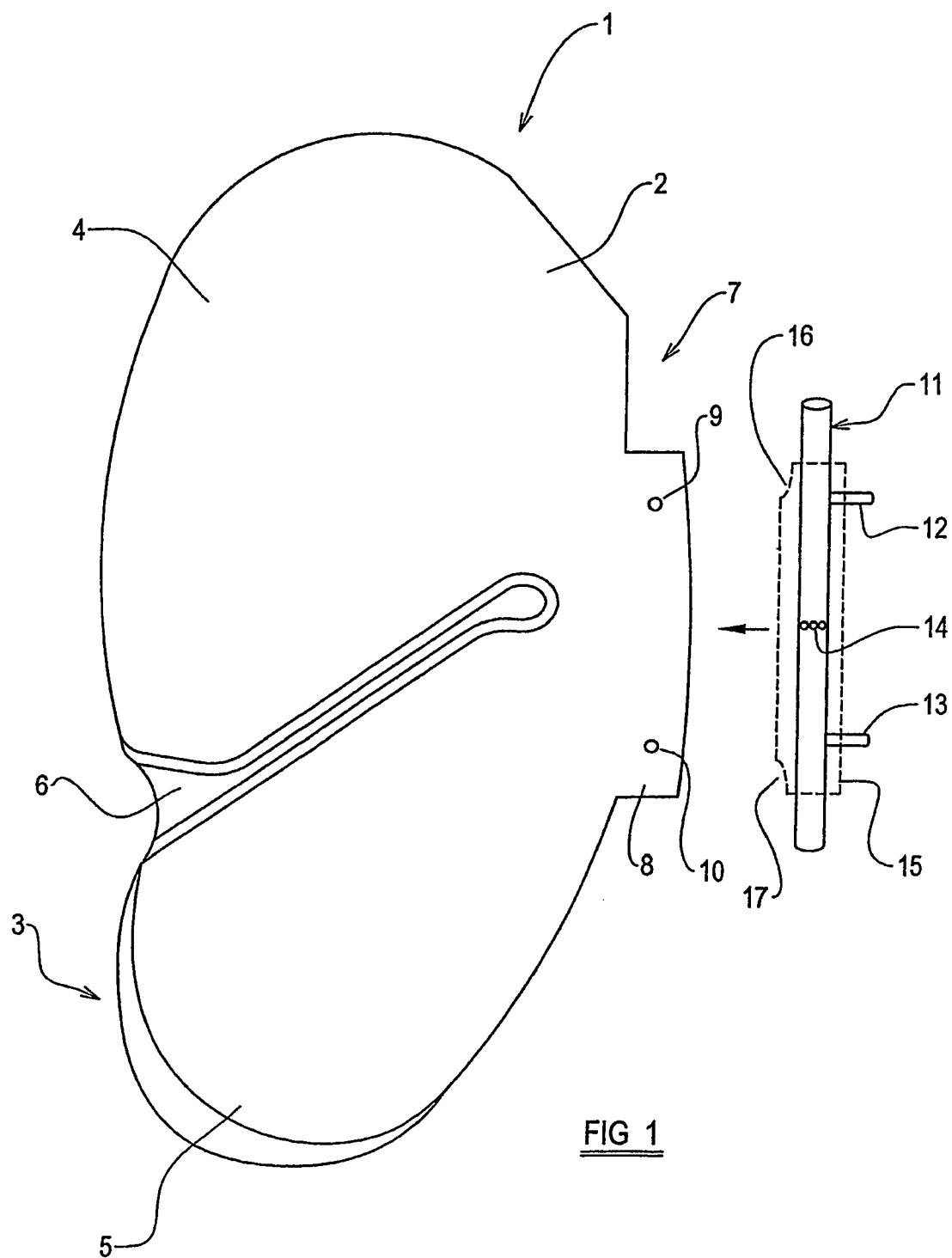
FIG. 1 is a perspective view of an air-bag in accordance with the invention.
Figure 2:
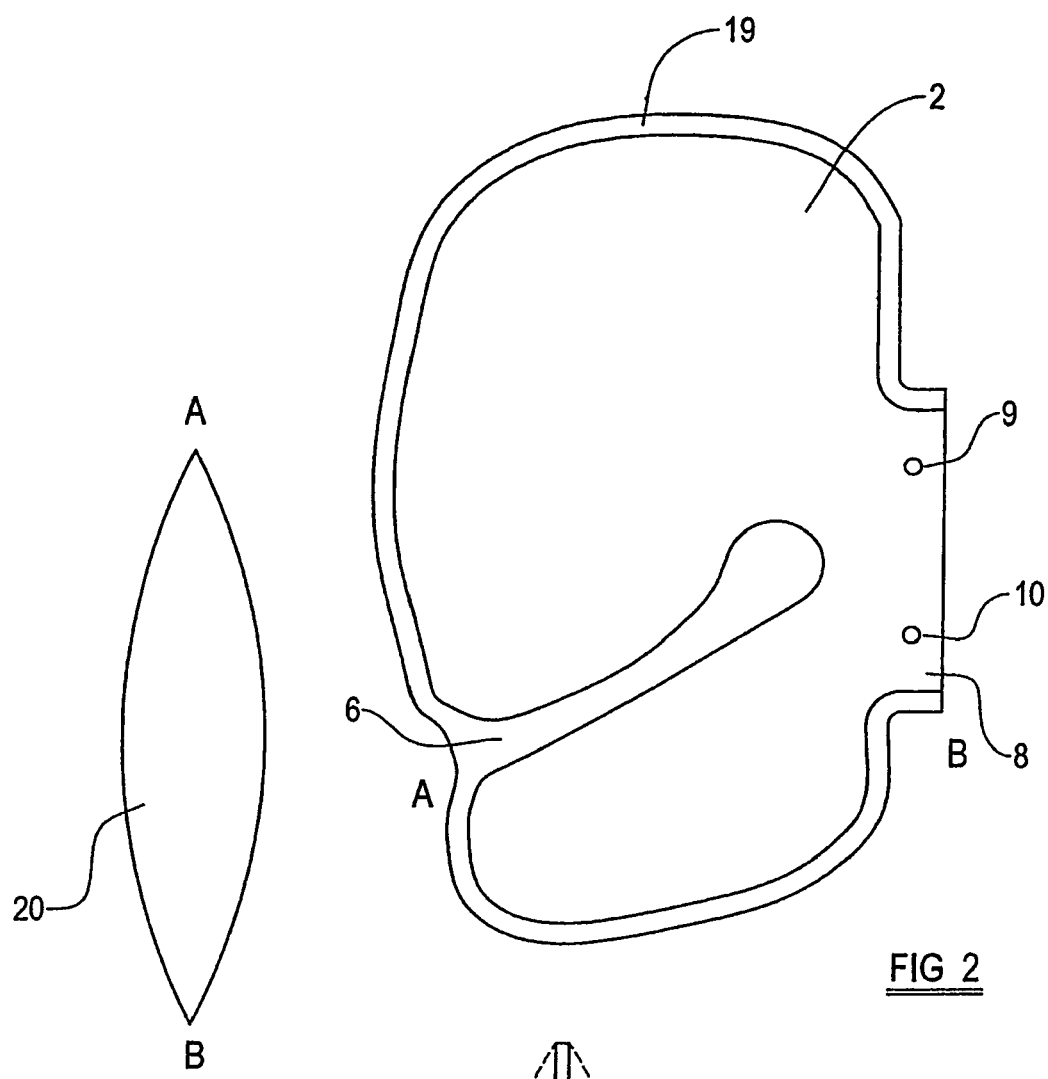
FIG. 2 is a view of two fabric elements used in the manufacture of the air-bag of FIG. 1.
Figure 3:
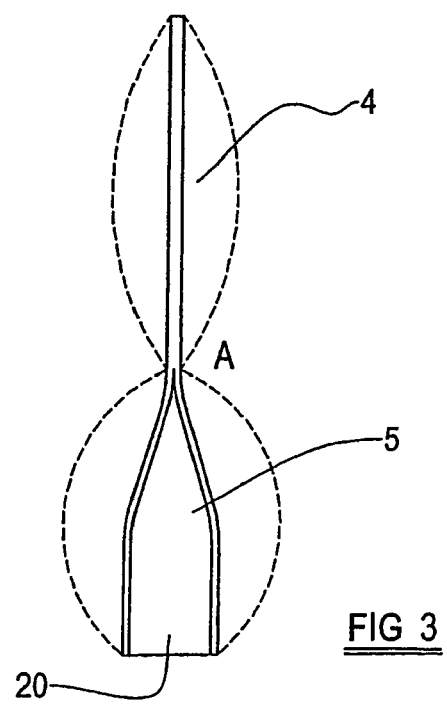
FIG. 3 is a side view of the air-bag of FIG. 1 when inflated.

Referring initially to FIGS. 1 to 3 of the accompanying drawings, a side air-bag having an upper inflatable region and a lower inflatable region will be described.

Referring initially to FIG. 1, a side air-bag 1 is formed from two superimposed identical layers of fabric 2, 3 (only the layer 2 being visible in FIG. 1). The layers of fabric 2, 3 are co-aligned so that the common area of superimposition is the total area of each layer, with no portion of either layer extending beyond the common area of superimposition.

As will be described, the two layers of fabric 2, 3 are secured together around their periphery to form an inflatable part to the air-bag, and the inflatable part is itself divided into two inflatable regions, namely an upper chamber 4 and a lower chamber 5 by means of a transversely extending seam 6. The seam 6 extends from about the middle (in a vertical sense) of part of the air-bag 1 which will be the forward-most part of the air-bag 1 when inflated, towards a mid part of a region which will be a rear part 7 of the air-bag when the air-bag is inflated. The seam 6 is upwardly inclined. At the rear part 7, of the air-bag 1 a flap 8 is provided having two apertures 9, 10 formed therethrough.

A generally cylindrical gas generator 11 is provided which is to be inserted into the air-bag through an aperture (not shown) formed near the flap 8. The gas generator 11 is provided with two radially projecting studs 12, 13 which are positioned and dimensioned to be received through the apertures 9, 10 formed in the flap 8. When the apertures 9, 10 formed in the flap 8 are engaged with the studs 12, 13 the air-bag 1 may be sealed. The gas generator 11 is provided with a plurality of gas outlet apertures 14. A cylindrical gas deflector 15 (shown in phantom in FIG. 1) is preferably provided which surrounds the gas generator 11 and defines gas outlets 16, 17.

The combination of the gas generator 11 and the gas deflector 15 is to be inserted into the air-bag 1 through the opening provided near the flap 8. The apertures 9, 10 in the flap 8 may be engaged with the radially projecting studs 12, 13 so as to seal the air-bag. The inner-most end of the seam 6 may engage the gas deflector 16, thus separating the upper chamber 4 from the lower chamber 5. Gas from the gas generator 11 may be injected into the upper chamber 4 through the gas outlet 16 and into the lower chamber 5 through the gas outlet 17.

FIG. 2 illustrates the sheet of fabric 2 used to form the air-bag of FIG. 1, showing the position of the seam 6 and also showing the position of a peripheral seam 19 which serves to join the fabric layer 2 to the other identical fabric layer 3. FIG. 2 also shows a separate fabric insert 20 of generally oval form, the insert 20 having opposed pointed ends.

It is to be understood that when the fabric layers 2, 3 are joined together by the peripheral seam 19, the insert 20 is introduced into the peripheral seam 19 in the lower-most part of the air-bag, between the fabric layers 2, 3 extending from a point A, at the end of the transversely extending seam 6, to a point B adjacent the base of the flap 8. The insert 20 has one side edge connected to the first fabric layer 2, and the other side edge connected to the other fabric layer 3, thus forming a gusset.

It is to be appreciated, therefore, that when the air-bag as shown in FIGS. 1 and 2 is inflated, the fabric layers 2, 3 will bow outwardly due to the pressure of gas within the chambers 4, 5, but because of the presence of the gusset formed by the insert 20, the lower chamber 5, as shown in phantom in FIG. 3, may have a substantial transverse dimension or depth whereas the upper chamber 4, again as shown in phantom in FIG. 3, will have a lesser dimension or depth. The lower chamber 5, which incorporates the gusset, can therefore be inflated to have a desirable substantial thickness or depth. The presence of the transverse seam 6 serves to minimize the volume of gas required to fully inflate the air-bag, and, in the arrangement shown, the gas generator may be designed so the upper chamber 4 may be inflated to a different pressure than the lower chamber 5 on actuation of the gas generator.

Figure 4:
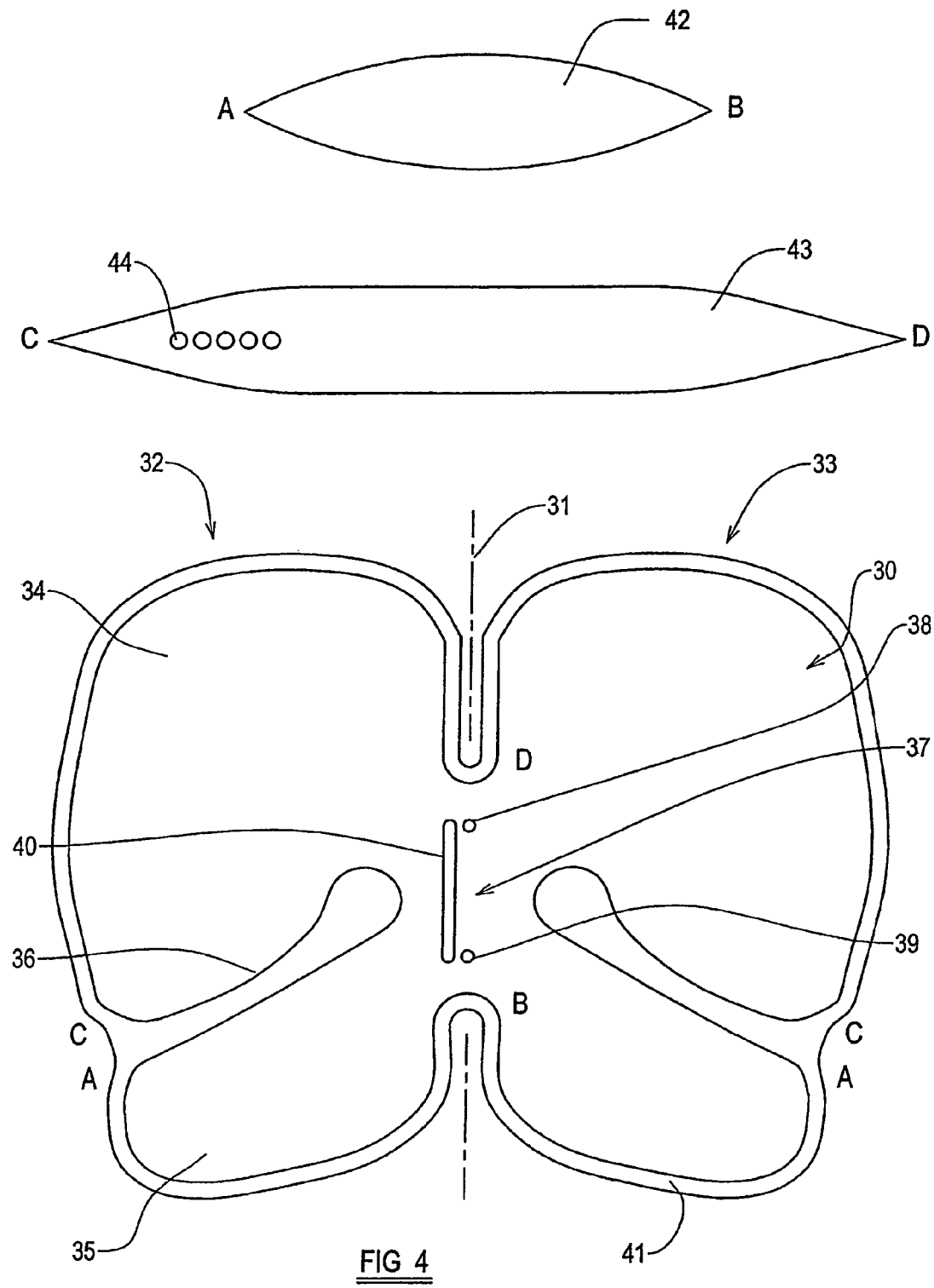
FIG. 4 is a view of fabric elements used in the manufacture of an alternative air-bag.

FIG. 4 illustrates a modified embodiment of the invention. In this embodiment, instead of having two separate fabric elements 2, 3, a single fabric element 30 is provided adapted to be folded along a fold-line 31 so that a first part 32 of the fabric element overlies a second, but substantially mirror image part 33. Thus, when superimposed, the common area of superimposition is the total area of each part 32, 33, with no portion of either part extending beyond the area of superimposition. The first part 32 has a configuration corresponding generally to that of the fabric element 2 described above with reference to FIG. 2, including an upper area 34 that is to form the side-wall of an upper inflatable chamber of a side air-bag and a lower area 35 that is to form the side-wall of a lower inflatable chamber of the side air-bag, the areas 34, 35 being separated by a region which is to accommodate a transversely extending seam 36 corresponding to the seam 6 of the air-bag 1 described above. The second part 33 of the fabric element has similar features and, in a central area 37, where the two parts 32 and 33 are conjoined, there are two apertures 38, 39 formed through the fabric element to receive mounting studs mounted on a gas generator. A slit 40 through which the gas generator may be inserted into the air-bag is also formed through the central area 37 of the fabric element. Again there is a peripheral region 41 where a seam is to be provided.

In this embodiment of the invention there are two infill elements or inserts 42, 43. The first insert 42 is of oval form with pointed ends and corresponds with the insert 20 of the embodiment described with reference to FIGS. 1 to 3. This insert 42 is intended to be inserted into the seam 36 between the areas 35 that are to form the side-walls of the lower inflatable chamber when the air-bag is assembled, extending from a point A adjacent the end of the seam 36 to a point B at the base of the central region 37 where the two separate parts 32, 33 of the fabric element 30 are conjoined. One side of the insert 42 is connected to a first part 32 of the fabric element 30, and the other side is connected to the other part 33 of the fabric element 30, again to form a gusset.

The second insert 43 is of somewhat larger size, but again is of generally oval form having pointed ends, this insert being configured to be inserted into the seam 36 between the areas 34 that are to form the side-walls of the upper chamber, extending from a point C adjacent the end of the seam 36 to a point D at the upper-most part of the region 37 in which the two parts 32, 33 of the fabric element are conjoined. Thus, the insert 43 forms a second gusset. The insert 43 is provided with a plurality of vent holes 44.

It is to be appreciated, therefore, that in the embodiment of FIG. 4 not only is the lower inflatable chamber provided with a gusset constituted by the infill element 42 but also the upper inflatable chamber is provided with a gusset constituted by the infill element 43.

The gussets would initially be tucked into the interior of the air-bag, thus being trapped between the two parts 32, 33 of the fabric element 30. Thus the vent holes 44 would initially be closed, and no gas would be able to pass out through the vent holes 44. The vent holes would, however, become exposed on inflation of the air-bag and gas would then be able to escape through the vent holes.

In the embodiment of FIG. 4, both the lower chamber and the upper chamber may have substantial thickness or depth whilst requiring a minimum quantity of gas for the inflation of the air-bag. In the region of the seam 36 the air-bag has a lesser thickness or depth.

Figure 5:
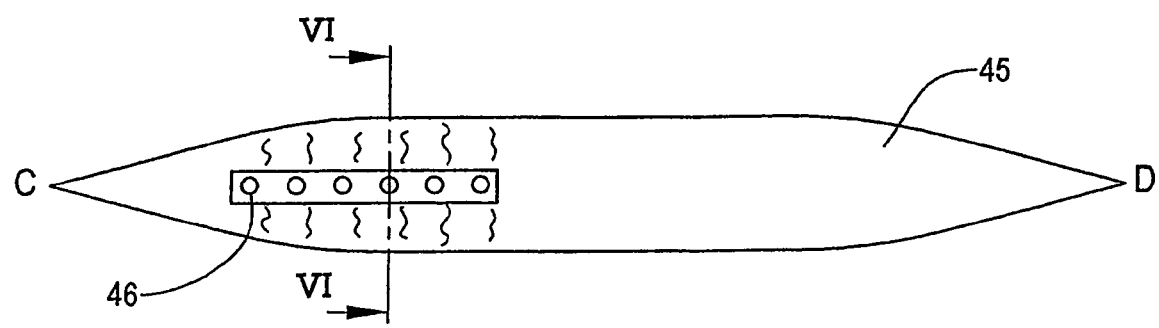
FIG. 5 is a view of an alternative component for use in forming the air-bag.
Figure 6:
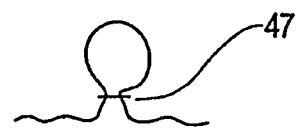
FIG. 6 is a sectional view taken on the line VI-VI of FIG. 5.

Turning now to FIG. 5, a modified insert 45 is shown intended to replace the insert 43 as described above. The insert 45 is provided with a plurality of vent holes 46, but the region of the insert provided with the vent holes 46 has been pinched and closed by means of a tear-seam 47 (see FIG. 6). The tear-seam 47 thus serves initially to seal the vent holes 46. On inflation of the air-bag, when the pressure of gas within the air-bag reaches a predetermined pressure sufficient to break the tear-seam, the tear-seam breaks and gas may then escape through the vent holes 46.

Whilst the embodiments described above have all included at least one insert or infill to form a gusset in a three-dimensional air-bag, a three dimensional air-bag may alternatively be formed using two layers of fabric superimposed to define a common area of superimposition. In this embodiment, at least one of the layers of fabric has a region which extends beyond the common area, with the periphery of the first layer of fabric being secured to the periphery of the second layer of fabric, thus forming an air-bag with three-dimensional properties. Preferably the length of the periphery of one of the layers of fabric is identical to the length of the periphery of the other layer of fabric.

Figure 7:
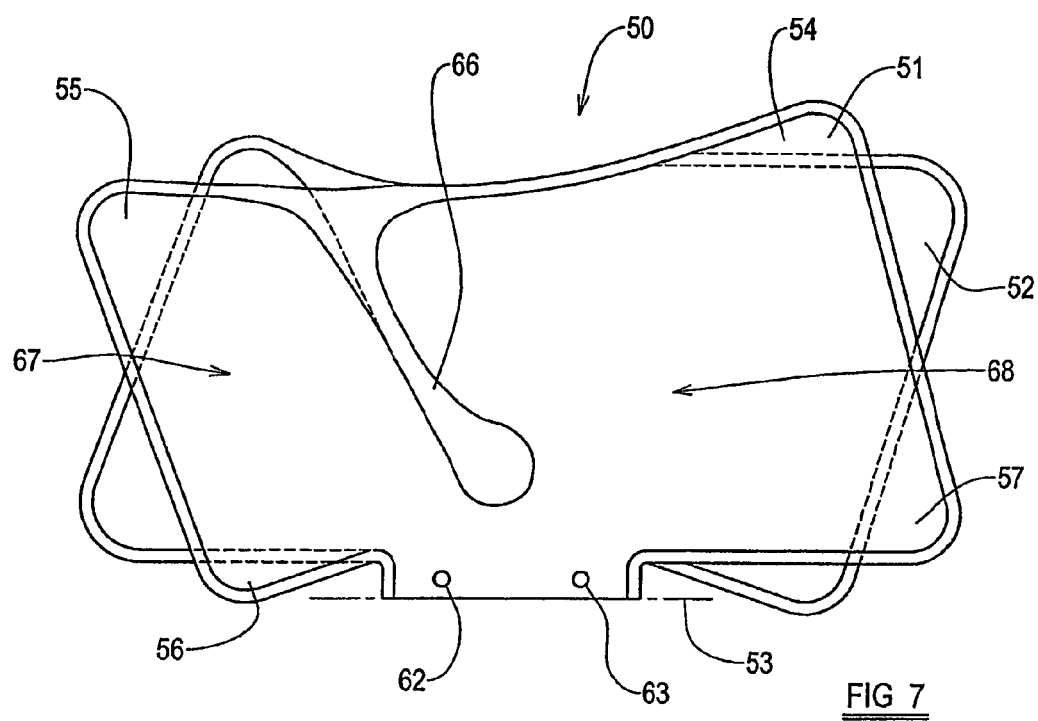
FIG. 7 is a top view of a folded single fabric element during an initial stage in the assembly of an air-bag.
Figure 8:
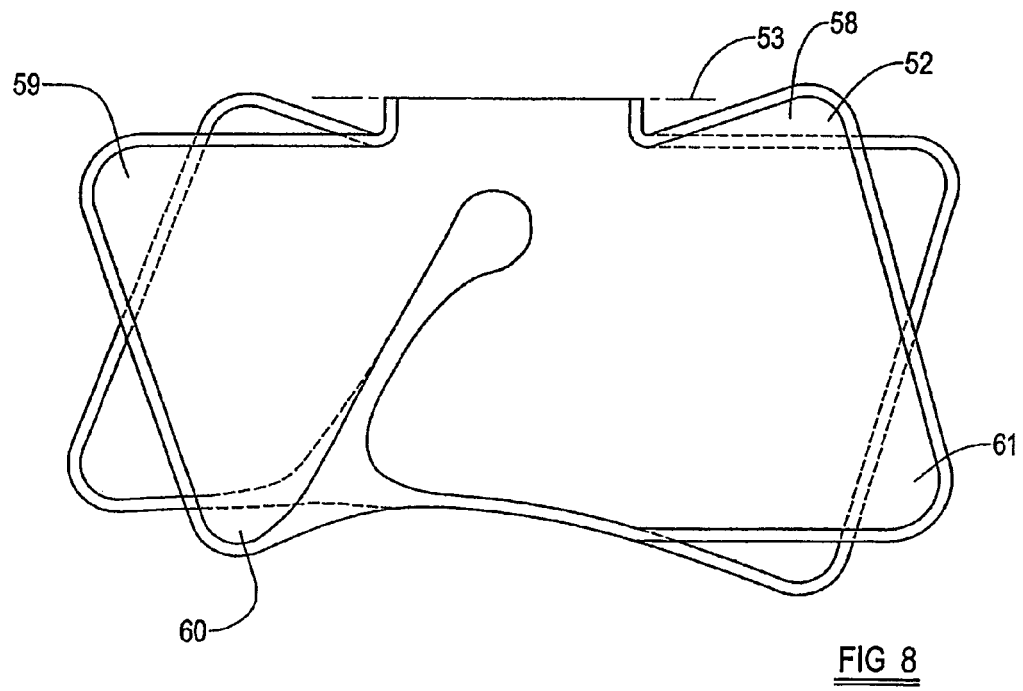
FIG. 8 is a bottom view of the fabric element of FIG. 7.

FIGS. 7 and 8 show, from opposite sides, a single fabric element 50 having two parts 51, 52 which have been folded about a fold-line 53 so as to be superimposed as an intermediate step in the fabrication of the air-bag. The part 51 is shown to be on the top in FIG. 7 and the part 52 is shown to be on the top in FIG. 8. It can be seen that there is a very substantial area of common overlap in which the part 51 partially overlies the part 52, but there are protruding portions 54, 55, 56, 57 of the part 51 which protrude beyond the area of common overlap, and also it can be seen that there are protruding portions 58, 59, 60, 61 of the part 52 which extend beyond the area of common overlap.

It is to be appreciated that adjacent the fold-line 53, a region is provided having mounting apertures 62, 63 in the part 51, there being a slit or opening in the region of the fold-line 53 to enable a gas generator of the type shown in FIG. 1 to be introduced into the air-bag, with the studs on the gas generator being engaged with the apertures 62, 63 to hold the gas generator in position and to seal the air-bag.

It is to be understood that an internal transversely extending seam 66 is provided which interconnects the two parts 51, 52 of the fabric element 50 so the seam extends across the area of common overlap and terminates adjacent the said apertures 62, 63. Here it is to be understood that when the gas generator is mounted in position within the air-bag, a gas deflector provided on the gas-generator may contact the seam 66 thus separating the air-bag into two separate inflatable regions or chambers, the chambers being separated by the seam 66.

It is to be appreciated that as the air-bag is assembled from an intermediate position shown in FIGS. 7 and 8, the peripheries of the two superimposed parts 51, 52 are brought into alignment with an appropriate manipulation of the fabric of the air-bag, and the aligned peripheries are interconnected, for example by stitching, thus forming an air-bag in which there is a lower three dimensional inflatable region or chamber defined by the superimposed fabric layers in the region 67 and a corresponding upper inflatable region or chamber in the region 68. The protruding portions 54-61 all form infill elements, equivalent to the inserts of the embodiments described above. The inflatable regions or chambers 67, 68 may have a significant thickness or depth, when the air-bag is inflated, but the air-bag will have a minimum thickness or depth in the region of the seam 66.

Figure 9:
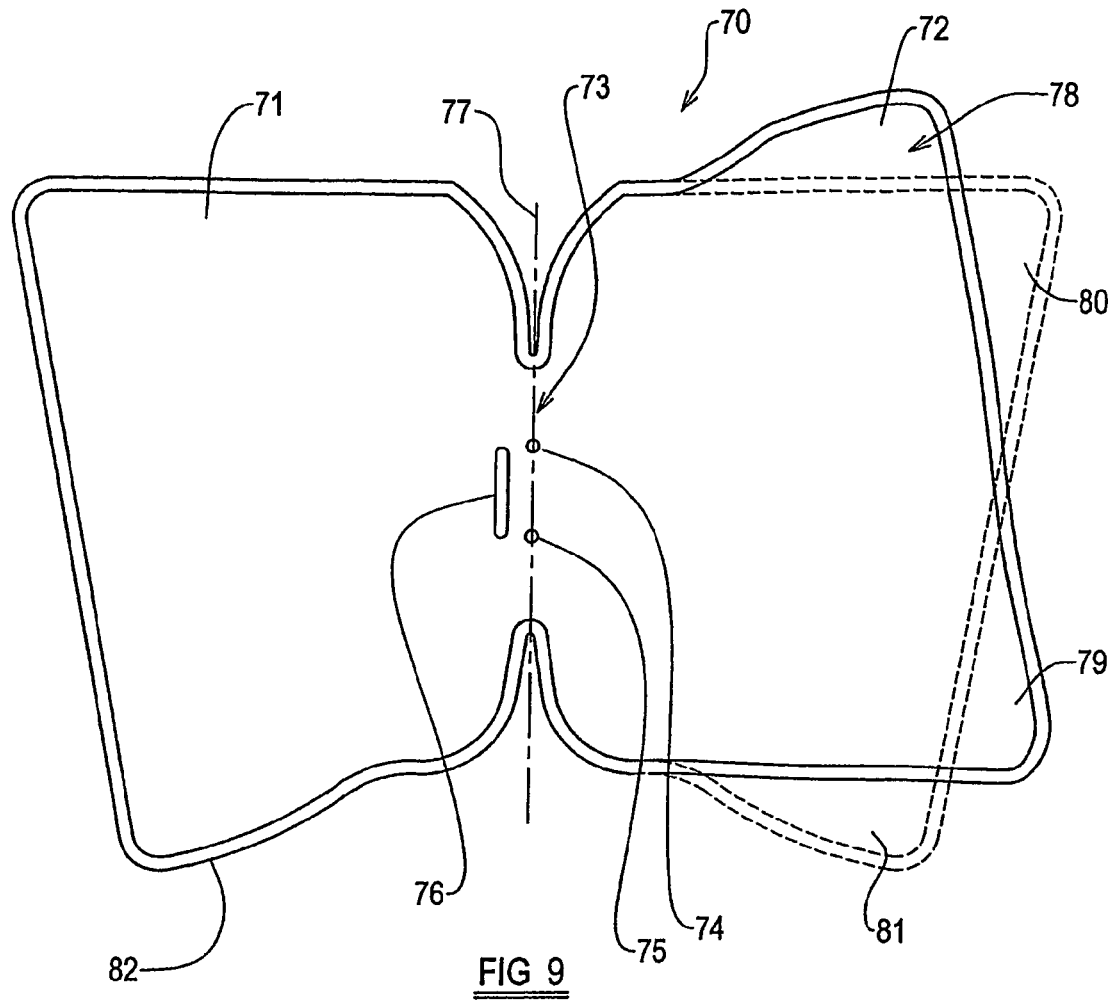
FIG. 9 is a view of another fabric element for forming an air-bag.

FIG. 9 illustrates another embodiment of the invention in which a single fabric element is used to form a three-dimensional air-bag. In this embodiment, however, there is no transverse seam dividing the air-bag into separate chambers.

Referring to FIG. 9, a single element of fabric 70 is shown having two substantially mirror-image parts 71, 72 interconnected by a connecting region 73. Within the connecting region 73 there are two apertures 74, 75 to engage studs provided on a gas generator and an access slit 76 to enable a gas generator to be inserted into the air-bag.

It is to be understood that during the fabrication process the fabric element 70 will be folded about a fold-line 77 which passes through the interconnecting region 73, so that the part 71 is partially superimposed over the part 72 as shown in phantom in FIG. 9. Here it is to be appreciated that when in the folded condition there is a substantial common area of overlap. As such, the part 72 will have regions 78 and 79 which extend beyond the area of common overlap, and the part 71 will have portions 80, 81 which extend beyond the area of common overlap. Again the fabric layers are interconnected by means of a peripheral seam 82, with the fabric being manipulated so that the peripheries of the areas are brought together.

Figure 10:
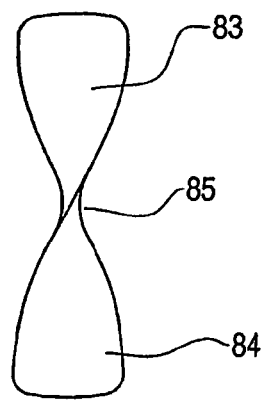
FIG. 10 is a diagrammatic view illustrating an inflated air-bag formed from the fabric element of FIG. 9.

An air-bag, fabricated from a fabric element as shown in FIG. 9 will, when inflated (see FIG. 10), tend to have an upper inflatable region 83 of relatively large thickness and depth, and a lower inflatable region 84 also of relatively large thickness and depth, interconnected by a neck region 85 of much less width or depth. Again the air-bag may be inflated using a minimum quantity of gas, but is provided with inflatable regions which have a substantial thickness or depth, thus enabling the air-bag to be brought into physical contact with a seat occupant relatively swiftly on deployment of the air-bag, and also enabling the air-bag to provide an adequate protective or cushioning effect.

While the above description constitutes the preferred embodiment of the present invention, it will be appreciated that the invention is susceptible to modification, variation and change without departing from the proper scope and fair meaning of the accompanying drawings.

The invention claimed is:

1. A side air-bag for a motor vehicle comprising a three-dimensional air-bag formed from two superimposed layers of fabric which, when laid flat, have a substantial common area of superimposition, the air-bag having a first inflatable region towards an upper part of the air-bag and a second inflatable region towards a lower part of the air-bag, the first and second inflatable regions being separated by a separating part of the air-bag which is constrained when the air-bag is inflated to have a thickness less than a thickness of either of the first and second inflatable regions, the air-bag having a gas generator mounting portion for receiving a gas generator and at least one gusset arranged between the two layers of fabric to create a three-dimensional shape, the gusset extending around a periphery of at least one of the first and second inflatable regions from an end of the separating part to the gas generator mounting portion so that the at least one of the first and second inflatable regions is enclosed by the separating part, the gusset and the gas generating mounting portion, wherein the air-bag is formed from the two layers of fabric of substantially identical configuration interconnected by means of a peripheral seam that includes stitching, and at least one insert attached to each of the two layers by the peripheral seam and positioned between the two layers of fabric to form the gusset that has two pointed ends that are disposed opposite of each other.

2. An air-bag according to claim 1 wherein the air-bag includes an upper chamber forming the first inflatable region and a lower chamber forming the second inflatable region, the upper chamber and the lower chamber being separated by a transversely extending seam forming the separating part.

3. An air-bag according to claim 1 wherein there are two inserts, one insert forming a gusset associated with the first inflatable region and the other insert forming a gusset associated with the second inflatable chamber.

4. An air-bag according to claim 1 wherein the insert is provided with at least one vent aperture.

5. An air-bag according to claim 4 wherein the at least one vent aperture is initially sealed by means of a tear-seam.

6. A side air-bag for a motor vehicle comprising a three-dimensional air-bag formed from two superimposed layers of fabric which, when laid flat, have a substantial common area of superimposition, and each of the two layers of fabric has one or more extra portions thereof which project beyond the area of superimposition, and the peripheries of the extra portions being interconnected together by means of a peripheral seam, which includes stitching, to form a gusset arranged between the two layers of fabric to create a three-dimensional shape, the air-bag having a first inflatable region towards an upper part of the air-bag and a second inflatable region towards a lower part of the air-bag, the first and second inflatable regions being separated by a separating part of the air-bag which is constrained when the air-bag is inflated to have a thickness less than a thickness of either of the first and second inflatable regions, the air-bag having a gas generator mounting portion for receiving a gas generator, the gusset extending at a periphery of at least one of the first and second inflatable regions between an end of the separating part and the gas generator mounting portion, wherein the one or more extra portions of both of the two layers of fabric are associated with the same inflatable region and the two layers of fabric are interconnected by the peripheral seam.

7. An air-bag according to claim 2 wherein the gas generator is disposed within the air-bag, the combination of the transversely extending seam and the gas generator substantially sealing the upper and lower chambers from each other, the gas generator being configured to inflate the upper and lower chambers to different pressures.

8. An air-bag according to claim 6 wherein the extra portions which project beyond the area of superimposition, and the resultant air-bag have, when inflated, an upper chamber which forms the first inflatable region and a lower chamber which forms the second inflatable region, there being a narrow inflated neck between the upper chamber and the lower chamber.

9. An air-bag according to claim 1 wherein the two layers of fabric form part of a single fabric element.

\* \* \* \* \*